United States Patent [19]

McCormick et al.

[11] Patent Number: 4,611,377
[45] Date of Patent: Sep. 16, 1986

[54] INTERCHANGEABLE ROBOT END-OF-ARM TOOLING SYSTEM

[75] Inventors: Peter E. McCormick, Dallas; Rick C. Edwards, Carrollton; Keith R. Crawford, Dallas, all of Tex.

[73] Assignee: EOA Systems, Inc., Dallas, Tex.

[21] Appl. No.: 616,974

[22] Filed: Jun. 4, 1984

[51] Int. Cl.[4] ............... B23Q 17/00; B23P 21/00; B23B 39/20
[52] U.S. Cl. ............... 29/407; 29/703; 408/35
[58] Field of Search ............ 29/407, 700–703; 408/1, 35

[56] References Cited

U.S. PATENT DOCUMENTS

| | | |
|---|---|---|
| Re. 30,132 | 10/1979 | Irie . |
| 3,661,051 | 5/1972 | Dunne et al. . |
| 3,845,284 | 10/1974 | Taguchi et al. . |
| 3,877,831 | 4/1975 | Maroschak ............... 408/35 |
| 3,885,295 | 5/1975 | Engelberger ............... 29/703 |
| 3,909,923 | 10/1975 | Kurimoto et al. ............... 408/35 |
| 3,920,972 | 11/1975 | Corwin, Jr. et al. . |
| 4,011,437 | 3/1977 | Hohn . |
| 4,046,263 | 9/1977 | Cwycyshyn et al. . |
| 4,092,719 | 5/1978 | Salmon . |
| 4,132,938 | 1/1979 | Sano et al. . |
| 4,162,573 | 7/1979 | Payne ............... 29/407 |
| 4,227,853 | 10/1980 | Woodford et al. . |
| 4,240,016 | 12/1980 | Inaba et al. . |
| 4,243,923 | 1/1981 | Whitney et al. . |
| 4,281,447 | 8/1981 | Miller et al. . |
| 4,283,764 | 8/1981 | Crum et al. . |
| 4,305,130 | 12/1981 | Kelley et al. . |
| 4,362,978 | 12/1982 | Pollard et al. . |
| 4,369,563 | 1/1983 | Williamson ............... 29/703 |
| 4,374,349 | 2/1983 | Inaba et al. . |
| 4,398,720 | 8/1983 | Jones et al. . |
| 4,409,718 | 10/1983 | Pryor ............... 29/407 |
| 4,488,241 | 12/1984 | Hutchins et al. . |

FOREIGN PATENT DOCUMENTS 2092776 8/1982 United Kingdom .

OTHER PUBLICATIONS

"Fig. 2.3 TV Robot Drilling Unit Schematic".
Mosaic, "Automating the Assembly Line", vol. 7, No. 5, Sep./Oct. 1976.
General Dynamics Corp., "A Proposal for Intelligent Task Automation", Aug. 13, 1982.

*Primary Examiner*—Howard N. Goldberg
*Assistant Examiner*—Steven Nichols
*Attorney, Agent, or Firm*—Richards, Harris, Medlock & Andrews

[57] ABSTRACT

An interchangeable robot end-of-arm tooling system is provided for performing multiple tasks using interchangeable tools within a work cell. The system includes a computer control for the system attached to the robot controller, a quick change adapter, and at least two tools adapted for attachment to the quick change adapter.

12 Claims, 10 Drawing Figures

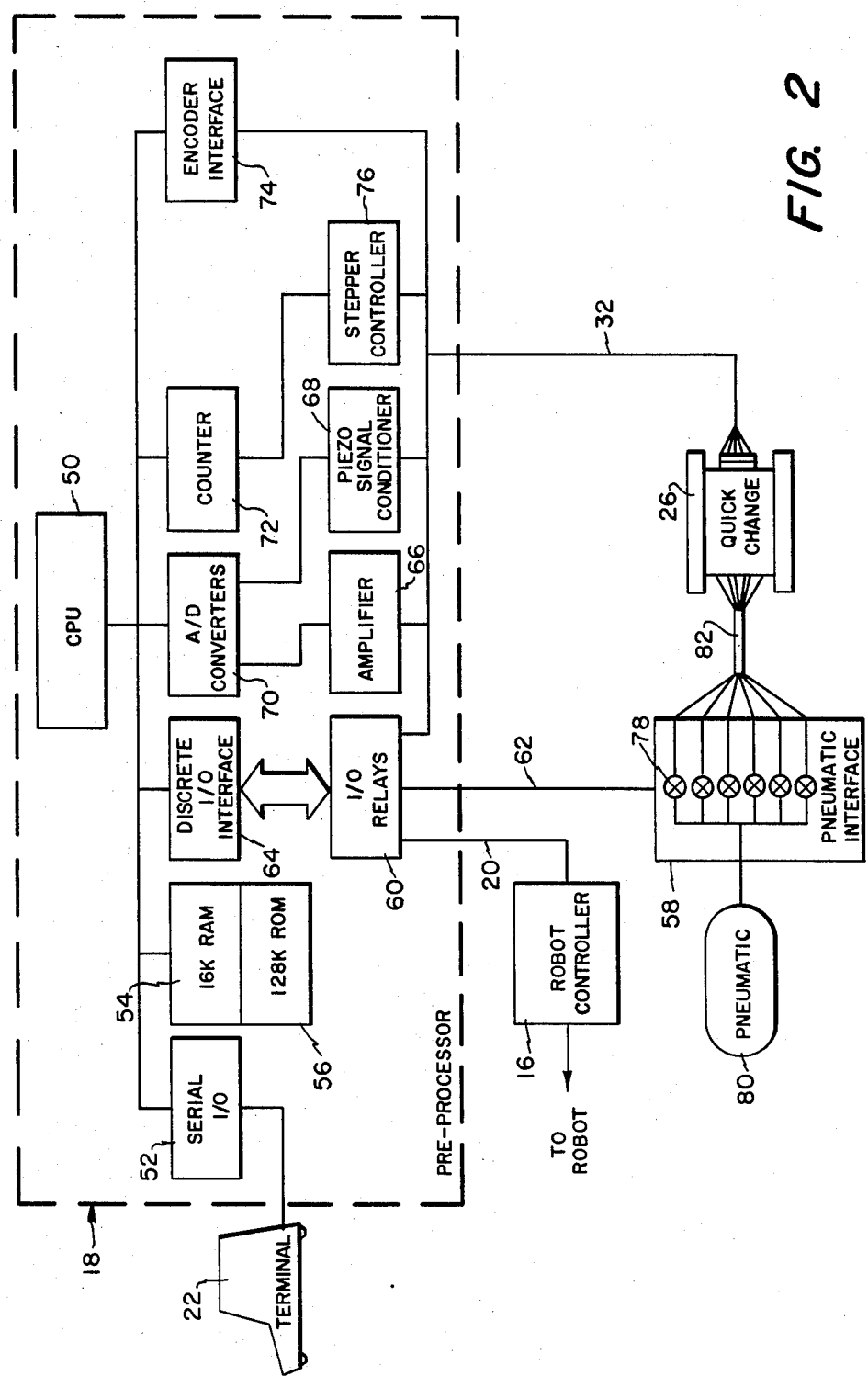

INTERCHANGEABLE ROBOT END-OF-ARM TOOLING SYSTEM

TECHNICAL FIELD

This invention relates to robotic tooling systems, and more particularly to an end-of-arm tooling system having interchangeable tools and operating under computer control.

BACKGROUND ART

It is known in the art to provide an articulated robot arm capable of accurately positioning the end of the arm at a given location within a work cell. It is also known to provide robot arms with relatively limited computer control adapted primarily to positioning the end of the arm. These prior art robot arms are useful only with dedicated end-of-arm tooling capable of performing one task, for example, loading/unloading articles or welding. At present there exists a large gap between robot arm technology and tooling technology related to tasks that can be performed at the end of the robot arm.

The result of this technology gap has been the slowing of flexible automation implementation into manufacturing facilities. A further inhibiting factor in implementing robots onto the factory floor has been the lack of an end-of-arm tooling system that is interchangeable among many tools. Because this interchangeable feature has not been available, applications which are ideally suited for interchangeable tooling have not been considered for flexible automation. Instead, robot applications have been limited to using dedicated tooling that can perform only one task. Thus, there presently exists a need for a robot end-of-arm tooling system that allows the robot to perform multiple tasks within a single work station. To allow adaptability to a variety of presently available robot arm systems, the tooling system should include its own control system in communication with and readily adaptible to controllers of presently existing robot arms.

SUMMARY OF THE INVENTION

The present invention is an interchangeable robot end-of-arm tooling system that allows a variety of intelligent tools to be picked up and replaced by a single robot arm and to be operated under independent computer control. This system combines computer sophistication with interchangeability to allow the end user to apply robotics in more applications. The tooling system includes a quick change adapter mounted to the robot arm that picks up and replaces any one of a family of manufacturing and assembly tools. This system of tools is intelligent in that an independent computer controller ("preprocessor") provides closed-loop control of the end-of-arm tooling in addition to giving the operator real time feedback as to the performance of the tool. The user can program whatever sequence of tasks he desires the tooling system to perform through a terminal. In addition, diagnostic software embodied in the overall software system allows all segments of the tooling system to be continuously monitored. A manual mode of operation is provided to allow the user to control individual steps of operation.

BRIEF DESCRIPTION OF THE DRAWINGS

A more complete understanding of the invention and its advantages will be apparent from the Detailed Description taken in conjunction with the accompanying Drawings in which:

FIG. 2 is a schematic block diagram of the invention;

DETAILED DESCRIPTION

Figure 1:
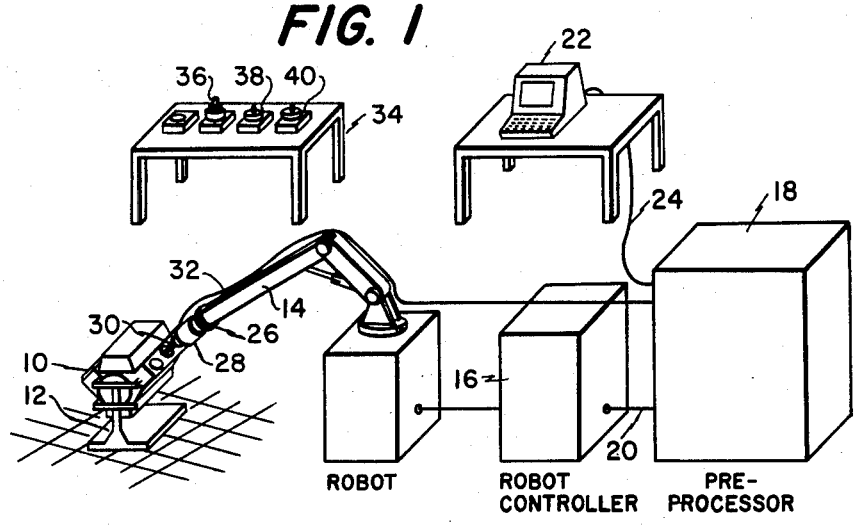
FIG. 1 is schematic representation of the environment of the invention.

Referring initially to FIG. 1, the present invention is illustrated in the environment of a factory where complex parts, such as engine block 10, are manufactured. Engine block 10 is fixed with respect to the factory floor by fixture 12. The interchangeable robot end-of-arm tooling system illustrated in FIG. 1 is adapted for use with a commercially available robot arm 14. By way of example, robot arm 14 could be a Model 776 manufactured by Cincinnati-Milacron of Cincinnati, Ohio. Robot arm 14 includes a robot controller 16. Robot controller 16 includes a computerized controller, but the lack in power and sophistication of the standard robot controller supplied with available robot arms precludes all uses of the robot arms other than simple positioning of the end of the arm with dedicated tooling.

The tooling system of the present invention includes a preprocessor 18, which is a computer controller specifically adapted for use with the tooling system. Preprocessor 18 is connected to the robot controller by means of cable 20. A terminal 22, with keyboard and display, is connected to the preprocessor 18 by cable 24. Quick change adapter 26 is permanently attached to the end of robot arm 14. Tool 28 is shown attached to the quick change adapter, and in the situation illustrated in FIG. 1, tool 28 is a drill having drill bit 30 positioned to drill a hole in engine block 10. A group of cables and hoses, generally indicated by reference numeral 32, connects quick change adapter 26 to robot controller 16, and supply the quick change adapter 26 with electrical power, compressed air, coolant, and data communications to and from the rest of the system. Table 34 holds additional tools 36, which, by way of example, could include grippers, nutrunners, or other tools. The essential object of this invention is to enable robot arm 14 to interchange between tools of 28, 36, 38 and 40 and perform tasks using these tools, all by computer control provided by preprocessor 18. In the preferred embodiment of the invention, the system includes preprocessor 18, with associated terminal 22, quick change adapter 26, and a number of tools, such as drill 28 and tools 36, 38 and 40.

Referring now to FIG. 2, preprocessor 18 includes CPU board 50, which in the preferred embodiment is a self-contained board designated by model number 3830 and manufactured by ISI Inc. of Sunnyvale Calif. CPU board 50 is connected to various input/output boards and memory boards. Serial I/O board 52 is connected to terminal 22 by cable 24. In the preferred embodiment, serial I/O board 52 is a model number 3711 board manufactured by ISI, Inc. Preprocessor 18 includes RAM 54 and ROM 56. The RAM is provided on a model number 3220-1 board manufactured by ISI, Inc., and the ROM is provided on two model number 7705 boards manufactured by Prolog Corporation of Monterey, Calif. These cards provide 16K bytes of RAM and 128K bytes of ROM. Preprocessor 18 communicates with the rest of the system through a bank of discrete I/O solid state relays 60. In the preferred embodiment, relay bank 60 comprises four model number PB-24 relay boards manufactured by Opto 22 of Huntington Beach, Calif. Relay bank 60 is connected to pneumatic interface 58 by means of cable 62. The status of the I/O relays in bank 60 is read by discrete I/O interface board 64 connected to CPU board 50. In the preferred embodiment, discrete I/O interface board 64 is a model number 7507 board manufactured by Prolog Corp. Certain of the tools in the systems generate analog measurement signals. Amplifier 66 is used to amplify strain gage type signals, and the preferred embodiment is a model number 3170 board manufactured by Daytronic of Miamisburg, Ohio. Other transducers in the system are piezoelectric transducers. Piezoelectric signal conditioner 68 is provided to analyze signals from these transducers, and in the preferred embodiment, is manufactured by PCB Piezotronics, Inc. of Depew, N.Y. The outputs of amplifier 66 and piezoelectric signal conditioner 68 are connected to an analog-to-digital converter board 70, which preferably is a model number 3830 board manufactured by ISI, Inc. Counter board 72 is provided to drive the stepper motors that are included in some of the tools and also to read the speed of rotation from certain pneumatic motors in the tools. In the preferred embodiment, counter board 72 is a model number 7206 manufactured by Prolog Corporation. Encoder interface board 74 is provided to read linear encoders provided in some tools, and preferably is a unit manufactured by Contemporary Control Systems, Inc. of Downers Grove, Ill. Finally, stepper controller board 76 is provided to enable operation of the stepper motors in the tools. In the preferred embodiment, stepper controller board 76 is a model number MIC8271 board manufactured by Kiowa Corporation of Eden Prairie, Minn.

Pneumatic interface 58 includes a number of electric valves 78 operated by preprocessor 18 through the relay bank 60. The pneumatic interface is connected to pneumatic pressure source 80. The output of each valve 78 is connected to quick change adapter 26 by means of a hose 82.

Figure 3:
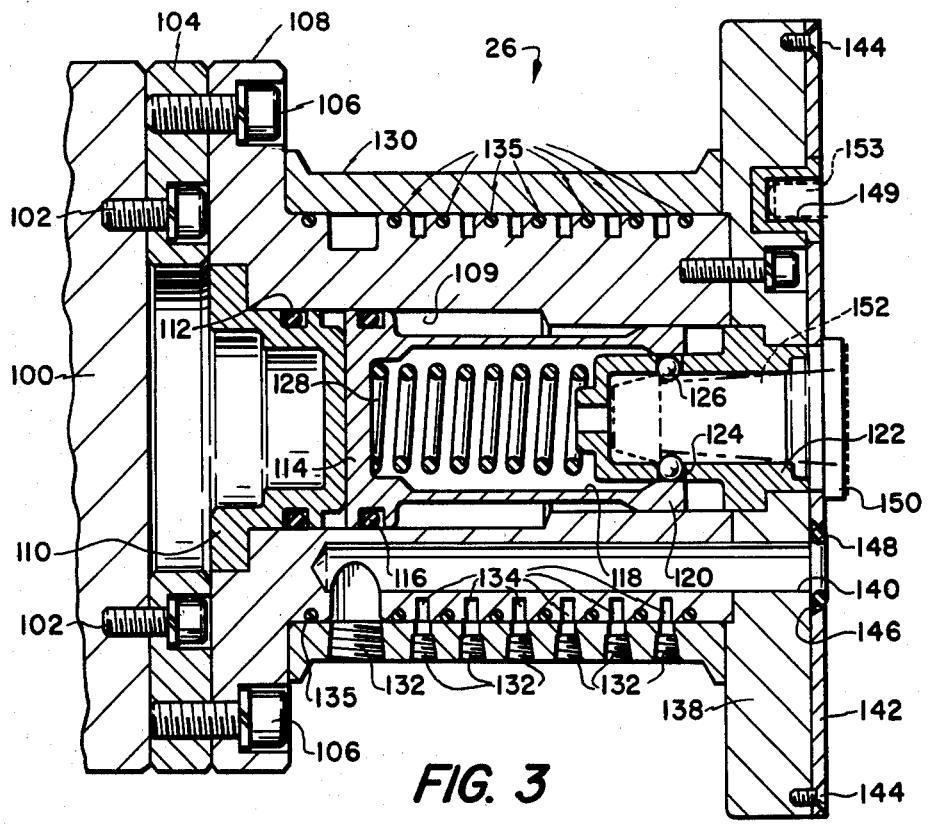
FIG. 3 is a partially broken away side view of a quick change adapter for use in connection with the present invention.
Figure 4:
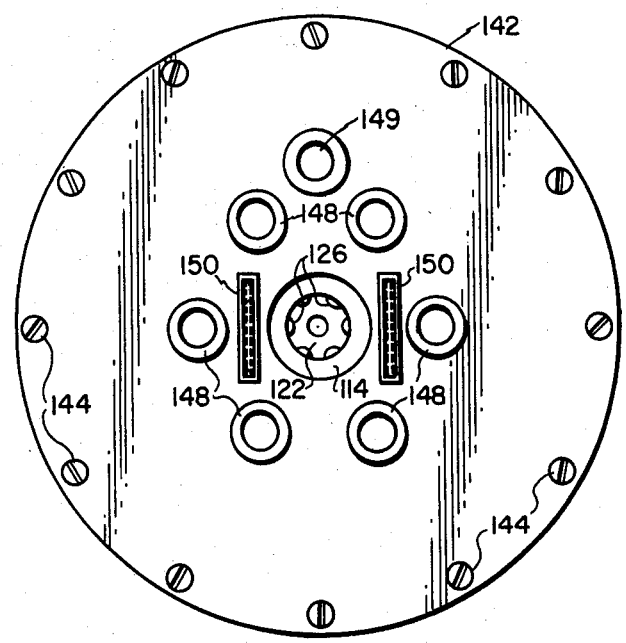
FIG. 4 is an end view of the quick change adapter of FIG. 3.

Referring now to FIGS. 3 and 4, quick change adapter 26 is permanently mounted to end 100 of robot arm 14 by means of a number of bolts 102 through mounting member 104. Attached to mounting member 104 by means of bolts 106 is main body 108. Disposed within an interior cavity 109 of main body 108 is plug member 110, which carries O-ring 112 to seal the interior cavity of main body 108. Piston 114 is mounted within the interior cavity 109 of main body 108 and carries O-ring 116. Piston 114 includes an inner cavity 118 and is adapted to reciprocate within cavity 109 of main body 108. In addition, piston 114 includes a lip portion 120 having a smaller inner diameter than inner cavity 118. Receiver 122 is fixed within a portion of piston 114. Receiver 122 includes a number of holes 124 which constrain balls 126. Spring 128 is trapped within cavity 118 of piston 114 and urges piston 114 away from receiver 122. Sleeve 130 is rotatably mounted upon an outer surface of main body 108. Sleeve 130 includes a plurality of ports 132 located therein, each of which communicates with a groove 134 in main body 108. Each groove 134 communicates with a passageway 136 through main body 108. O-rings 135 separate grooves 134 from each other. Flange 138 is attached to main body 108, and contains a passageway 140 in communication with each passageway 136. Endplate 142 is attached to flange 138 by means of screws 144. Endplate 142 includes a number of holes 146 corresponding to each of passageways 140 in flange 138. Each hole 146 has an inwardly-facing conical wall to trap an O-ring 148 against the outer surface of flange 138 adjacent to each passageway 140. Locator bushing 149 is disposed within flange 138 and endplate 142. Attached to endplate 142 are electrical connectors 150.

In operation, quick change adapter 26 enables the system of the present invention to pick up and drop off tools by a pneumatically actuated locking mechanism. The locking mechanism is comprised of piston 114, balls 126 and receiver 122. One of the ports 132 communicates by way of an associated groove 134 with interior cavity 109 between O-rings 112 and 116. Application of pneumatic pressure to interior cavity 109 between O-rings 112 and 116 causes piston 114 to move against the pressure of spring 128 towards receiver 122. This movement of piston 114 causes lip portion 120 to move away from balls 126, releasing balls 126 for outward movement. As will be described below, each of the tools used in the system includes a probe 152 having an enlarged end and a locator pin 153 shown in dotted lines in FIG. 3. When piston 114 is moved under pressure towards receiver 122, balls 126 are released outwardly to enable the enlarged end of probe 152 to pass by balls 126. When pressure on piston 114 is released, lip portion 120 forces balls 126 inwardly to block the probe 152 in receiver 122. Locator pin 153 of the desired tool fits into locator bushing 149 and aligns the tool with respect to quick change adapter 26. The desired tool to be used in an operation may require one or more pneumatic connections, depending on the type of the tool. Some tools also require connection to a cutting coolant sypply. These connections are made through ports 132 in sleeve 130, grooves 134 and passageways 136 and 140. The desired tool has a passageway that mates with a particular passageway 140 and associated O-ring 148 when the tool is locked into position. Ring 130 is rotatable with respect to main body 108, robot arm 14, and the attached tool. Therefore, end 100 of the robot arm 14 and attached tool may be rotated freely with respect to the pneumatic and coolant lines attached to quick change adapter 26 through sleeve 130. Alternatively, in environments where rotation of the robot arm and tool is not required, pneumatic and coolant connections can be made through threaded ports in main body 108 and the rotateable sleeve 130 may be omitted.

Figure 5:
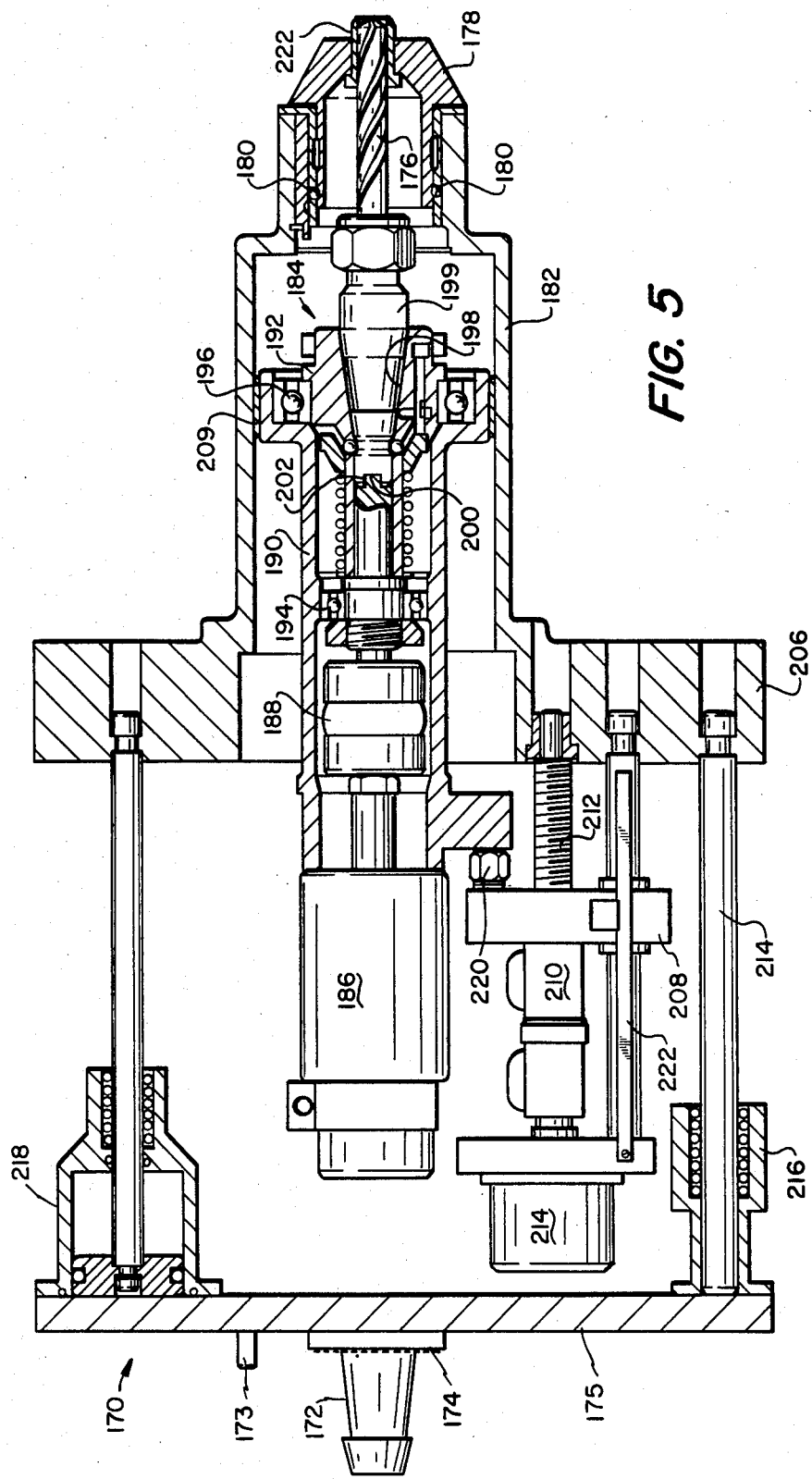
FIG. 5 is a partially broken away side view of a drill for use in connection with the present invention.

Referring now to FIG. 5, a drill 170 for use with the system of the present invention is illustrated. Drill 170 mates with adapter 26 by means of probe 172 and locator pin 173. An electrical connector 174 is provided to mate with connector 150 on adapter 26. When drill 170 is picked up by adapter 26, 32 electrical connections, 5 pneumatic ports and 1 coolant port in interface plate 175 are mated to corresponding elements in adapter 26. Drill bit 176 is held in nosepiece 178. Preferably, several nosepieces 178 and associated drill bits 176 are provided for interchangeable use with drill 170. Balls 180 removeably fix nosepiece 178 in body 182. Rotatably disposed within body 182 is spindle assembly 184. Spindle assembly 184 includes pneumatic motor 186, coupling 188, housing 190, receiver 192, and ball bearings 194 and 196. Receiver 192 includes a tapered wall 198 to receive drill holder 199. Drill bit 176 is firmly attached to drillholder 199. A slot 200 at the end of drillholder 199 interfits with the end of shaft 202. Shaft 202 is connected to pneumatic motor 186 through coupling 188 and ball bearing 194, while receiver 192 is rotatably mounted within spindle assembly 184 by means of ball bearing 196. Ball 204 releasably retain drillholder 199 in contact with tapered wall 198 and shaft 202. Spindle assembly 184 is mounted to cage 206 by means of arm 208 and to body 182 by sliding surfaces 209. Arm 208 is mounted to ball screw 210 engaging screw 212. Screw 212 is rotatably mounted in cage 206 and is attached to stepper motor 214. Cage 206 is mounted to interface plate 174 by means of rods 214 in support 216 and pneumatic cylinder 218. Actuation of pneumatic cylinder 218 causes cage 206 to move away from interface plate 174. Thrust transducer 220 is mounted between arm 208 and housing 190. Linear encoder 222 is mounted between stepper motor 214 and arm 208.

In operation, drill 170 is mounted to adapter 26. A plurality of nosepiece, drillholder and drill bit assemblies are located in table 34. The desired nosepiece 178 with associated drill bit 176 is picked up by the spindle 184 when cage 206 is actuated outwardly by pneumatic cylinder 218. Rotation of the drill bit 176 is provided by pneumatic motor 186, and drill thrust is provided by stepper motor 214. The depth of drill advancement, or position of the drill, is indicated by a linear encoder 222. The thrust pressure is provided by a thrust transducer 220. In the preferred embodiment, a high degree of accuracy is obtained by using a template over the workpiece. The template mates with outwardly projecting portion 224 of nosepiece 178 to support the drill 170 and to keep the drill bit 176 from "walking" on the part. In the preferred embodiment, pneumatic motor 186 provides 1.8 horsepower and stepper motor 214 and ball screw 210 provide up to 400 pounds of thrust. Stepper motor 214 feeds the drill bit 176 into the workpiece at a precise feed rate and also allows it to rapidly advance and retract from the workpiece. The amount of thrust required to advance the drill is monitored to determine when drill bit 176 becomes dull. Under control from the preprocessor 18, dull bits can be automatically changed by selecting alternate nosepiece and drill bit assemblies.

Figure 7:
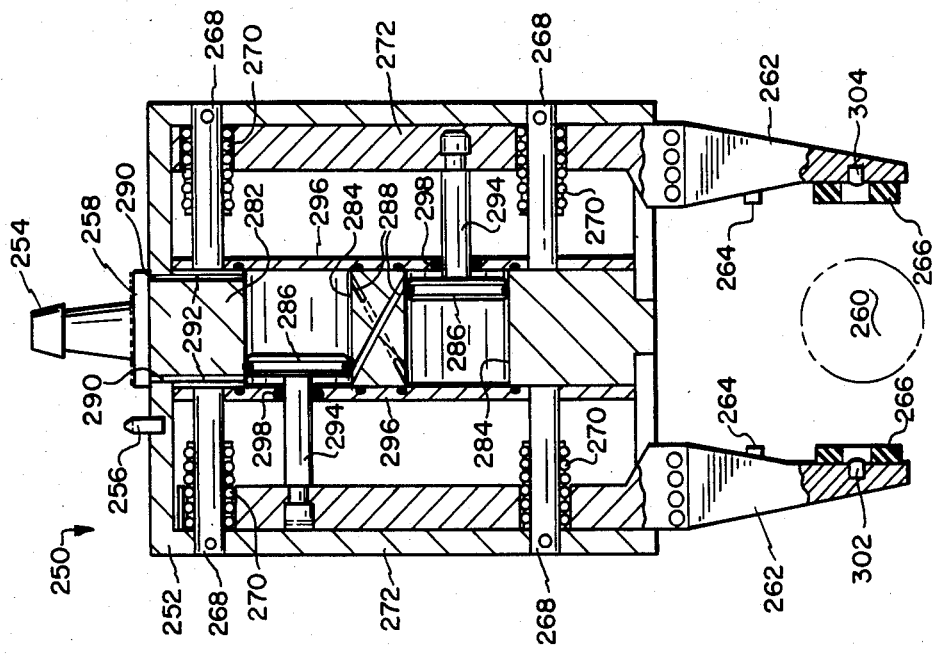
FIG. 7 is a partially broken away side view of the gripper of FIG. 6.
Figure 6:
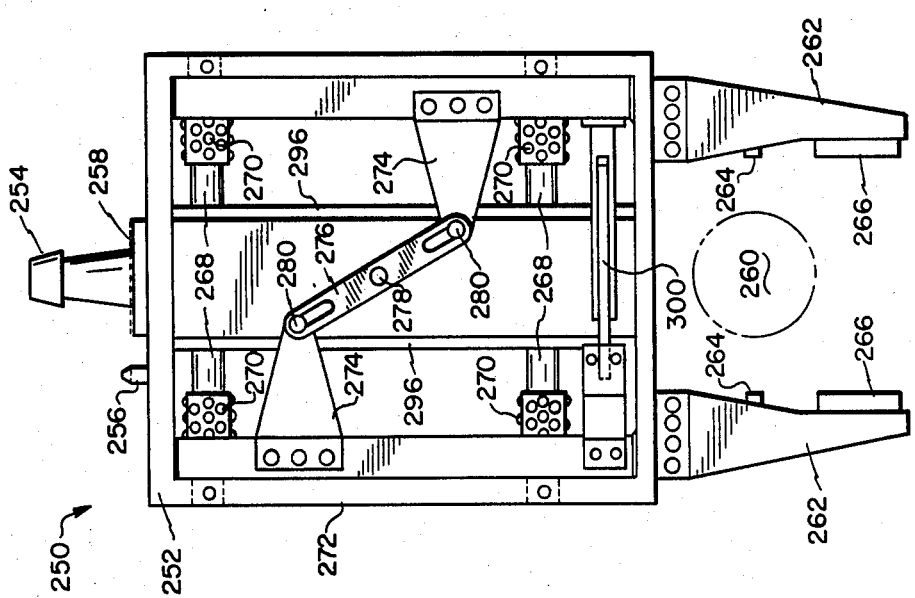
FIG. 6 is a side view of a gripper for use in connection with the present invention.

Referring now to FIGS. 6 and 7, parts measurement gripper 250 includes frame 252 attached to probe 254 for connection with adapter 26. Locator pin 256 and electrical connector 258 are provided as in the tool previously described. Parts measurement gripper 250 is adapted to measure the dimensions of a part 260 (shown in dotted lines) by causing fingers 262 to close and the part 260 to be contacted across the dimension to be measured by measurement pads 264, as shown in FIG. 6. Alternatively, before or after measurement, the part 260 can be gripped and manipulated by causing fingers 262 to close and contacting the part at gripper pads 266.

In the preferred embodiment, measurement pads 264 are of a hard material to ensure dimensional accuracy, and gripper pads 266 are of a resilient material to enable a firm, nondamaging grip on the part. Fingers 262 are supported by frame 252 by means of rods 268, bearings 270 and sliders 272. Bearings 270 are adapted for relative movement with respect to rods 268 and inner surface of sliders 272, such that axial movement of bearings 270 is exactly half the axial movement of the sliders 272. Bearings 270 are high precision bearings to enable measurement accuracy. The sliders 272 are connected to one another by extensions 274 and link 276. Link 276 is pivotally attached to frame 252 at pivot point 278. Extensions 274 are pivotally and slideably connected to link 276 at attachment points 280. As best shown in FIG. 7, frame 250 includes a centrally located cylinder block 282. Cylinder block 282 includes cylinders 284 enclosing pistons 286. Each piston 286 is sealed within cylinder 284 by an O-ring. Cylinders 284 are pneumatically connected in a crisscross fashion by passageways 288, and the cylinder 284 closest to probe 254 is connected to ports 290 by passageways 292. Each slider 272 is connected to a piston 286 by means of a rod 294. Cover plates 296 confine pistons 286 within cylinders 284 and seal rods 294 for slideable movement by means of seal 298. A high precision linear encoder 300 is provided to sense the distance between the measurement pads 264. In the preferred embodiment, linear encoder 300 is a model 8745 manufactured by Teledyne-Gurley of Troy, N.Y. Presence of a part 260 between fingers 262 is detected by means of infra-red emitter 302 and detector 304 within fingers 262.

In operation, parts measurement gripper 250 is attached to adapter 26, and electrical connections and pneumatic connections are facilitated as described above. Parts measurement gripper 250 is positioned such that part 260 to be measured is located between measurement pads 264. Pneumatic pressure is applied to pistons 286 to cause sliders 272 to be pulled inward. The position and speed of movement of sliders 272 and attached fingers 262 are equalized by link 276 attached to sliders 272 by means of extensions 274. Sliders 272 are maintained parallel to one another by means of bearings 270 and shafts 268. Accurate measurement is accomplished by linear encoder 300. Relative position between measurement pads 264 is sensed by linear encoder 300. To manipulate part 260, the parts measurement gripper 250 is positioned such that part 260 is between gripper pads 266, which allow for high pressure grasping and support of part 260. The presence of a part 260 between gripper pad 266 is detected by infra-red detector 304, which detects when light received from emitter 302 is interrupted. In the preferred embodiment, parts measurement gripper 250 is capable of gauging machined or fabricated parts to an accuracy of less than 1/1000th of an inch, which enables strict quality control to be maintained within a work cell. The parts measurement gripper 250 has a lifting capacity of 50 pounds, and fingers 262 have a total travel of 4 inches. Parts measurement gripper 250 is particularly useful in machine load/unload applications where quality control is important. The use of the parts measurement gripper 250 allows the user to eliminate costly gauging systems and thus reduce overall cycle time in a machine load/unload application. For example, parts measurement gripper 250 may be used to measure each part 260, determine whether the part is within specifications, and then deposit the part in one of two bins depending on whether the part is acceptable or unacceptable.

Figure 8:
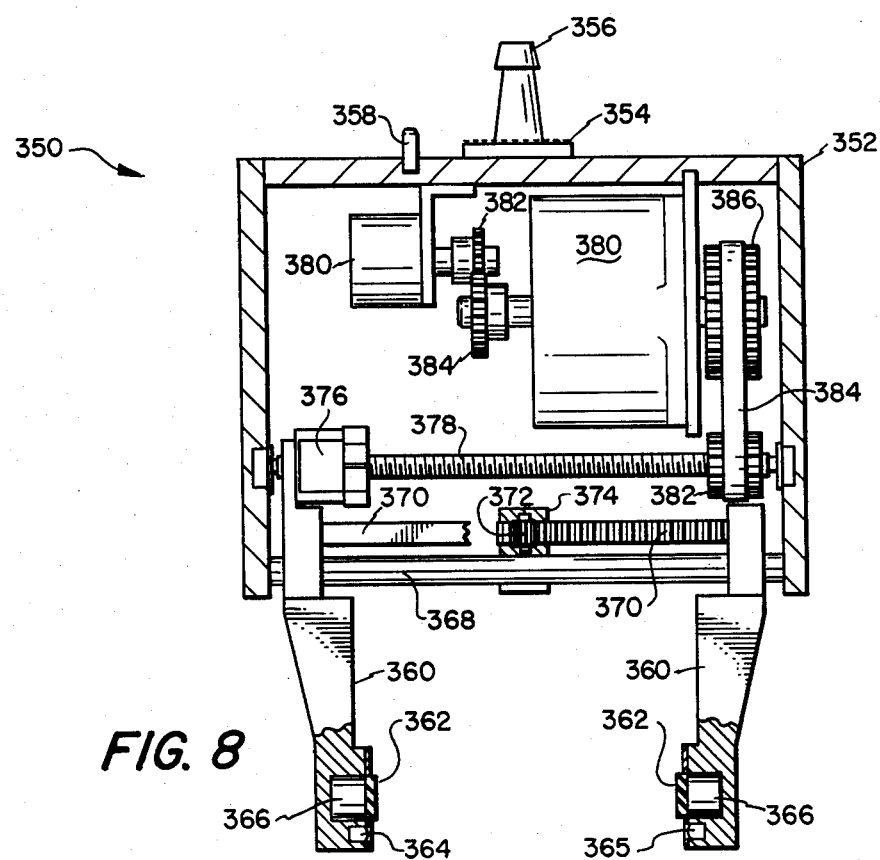
FIG. 8 is a partially broken away side view of a gripper for use in connection with the present invention.

Referring now to FIG. 8, a tactile gripper 350 includes a frame 352, electrical connector 354, probe 356 and locator pin 358 for connection to adapter 26 as described above. Fingers 360 include resilient pads 362 for gripping and manipulating objects located between fingers 360. Infra-red emitter 364 and detector 365 are provided to detect the presence of a part as described above with respect to the parts measurement gripper. Located within fingers 360 underneath pads 362 are force transducers 366. Fingers 360 are slideably mounted within frame 352 along bearing surface 368. Each finger 360 is attached to a gear rack 370, which engages an idler gear 372 mounted in block 374 attached to frame 352. One of arms 360 is also connected to ball screw 376, which engages screw 378 rotatably mounted in frame 352. Ball screw 378 is connected to a stepper motor 380 by means of sprocket 382, belt 384 and sprocket 386. The shaft of stepper motor 380 is also connected to position transducer 388 by means of gears 382 and 382. Located within fingers 360 are force transducers 366.

In operation, the tactile gripper 350 may be activated to move to a pre-programmed position or force. The velocity of finger travel is also programmable. A signal train is provided to stepper motor 380 which drives ball screw 378 and position transducer 380. Activation of ball screw 378 causes fingers 360 to move in or out with equal velocity and position due to gear racks 370 and idler gear 372. Force transducers 366 detect the amount of force being applied to a part between fingers 360 and may be used in conjunction with position transducer 380 to close a servo loop for stepper motor 380. In the preferred embodiment, tactile gripper 350 has a ten pound lifting capacity and three inches of fingertip travel. The user can format the tactile gripper 350 to grasp at various speeds until a certain position or grasping force is detected. Preferably, the tactile gripper 250 is used in lightweight gripping applications that require force feedback or fingertip positioning feedback.

Figure 9:
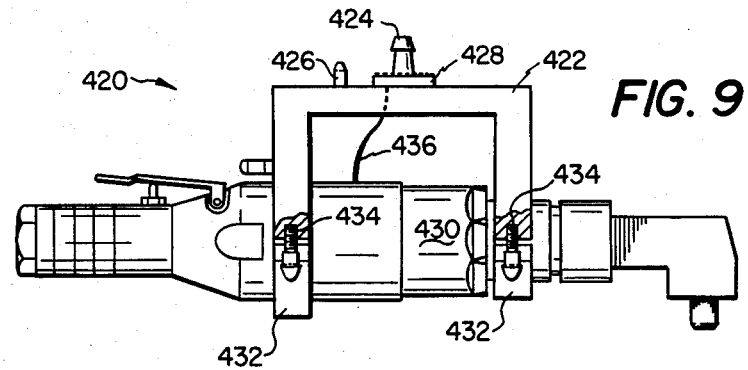
FIG. 9 is a partially broken-away side view of a nutrunner for use in connection with the present invention.

Referring now to FIG. 9, nutrunner 420 includes frame 422, probe 424, locator pin 426 and electrical connector 428 for connection to adapter 26 as described above. Frame 422 holds nutrunner 430 by means of clamp elements 432 and screws 434. In the preferred embodiment, nutrunner unit 430 is a Series 8 or 9 unit manufactured by Ingersol-Rand of East Brunswick, N.J. The preferred nutrunner is pneumatically operated and includes transducers for determining the torque applied and the amount of rotation. The transducers within the nutrunner unit 430 are attached to electrical connector 428 by cable 436.

In operation, nutrunner 420 provides the user with a large degree of flexibility when choosing the appropriate nutrunner for an application. Through preprocessor 18, the user can specify different tensions or torque control to be applied by the nutrunner 420. In addition, cross threading or other fastener abnormality can be detected, to ensure that all nuts are seated properly and precisely to the user's specifications.

Figure 10:
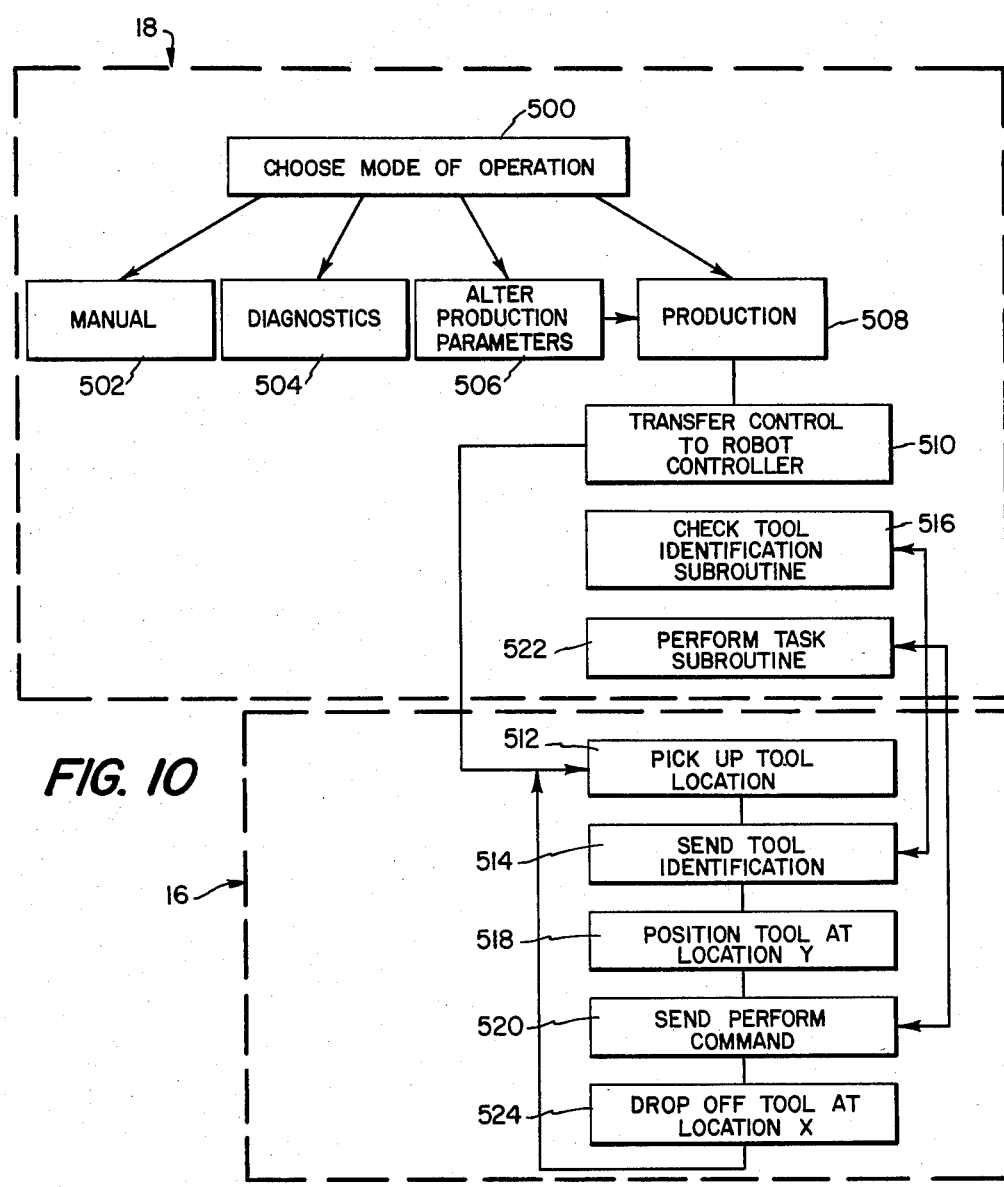
FIG. 10 is a flow chart of software adapted for use in connection with the present invention.

Referring now to FIG. 10, software control of the system is diagramatically illustrated. In step 500, the user chooses the mode of operation of the system from a menu. The user may choose between any of four modes, including manual mode 502, diagnostic mode 504, alter production parameters mode 506 and production mode 508. Alter production parameters mode 506 is used to set or change the parameters the system will use in production mode 508. In production mode 508, the initial step 510 is to transfer control to robot controller 16. Robot controller 16 is instructed to move the quick change adapter 26 to a location X in step 512. Step 512 also includes picking up whatever tool is located at location X. After a tool has been picked up, the robot controller reads the tool identification code which is hardwired into the tool. In step 514, robot controller 16 sends the tool identification code back to the processor 18, where a subroutine is performed to ensure that the proper tool has been picked up picked up in step 516. After the tool identification is checked, the robot controller is instructed to position the tool at a location Y in step 518. Next, a perform code is returned to preprocessor 18 in step 520, and the appropriate perform task subroutine is run at step 522. Finally, after the perform task subroutine is finished, in step 524 the robot controller 16 is instructed to return the tool to location X and drop it there.

FIG. 10 is generally illustrative of a typical sequence of steps used in performing a task. Although FIG. 10 illustrates the tool performing only one task before being dropped off, in some applications, the same tool may perform several similar tasks before drop off. The specific steps used in operating the system will now be described in more detail.

In operation, preprocessor 18 communicates with the robot controller 16 through the discrete I/O in relay bank 60 and coordinates motions of the attached tool to execute the commands. Discrete I/O allows the preprocessor to communicate with most presently available robot controllers. The hardware in the preprocessor 18 is modular to allow the user to purchase only those items needed to support the tooling purchased. If, at a later date, the user decides to add additional tooling, the preprocessor 18 can be augmented to support them. A preprocessor 18 is needed for several reasons. First, most robot controllers do not have sufficient processing power to maintain closed loop control of intelligent tooling. Second, a preprocessor 18 is an effective method of interfacing a tooling system system to many types of presently available robots. Third, the user is able to send the preprocessor 18 simple instructions such as "on point, begin drilling" so that the user does not need to concern himself with programming the instructions that run the tools. In addition, the preprocessor 18 will return status information to the robot controller 16 such as "completed drilling, go to next hole".

The operating software is stored in ROM 56. A program listing of the operating software has been submitted as an appendix to this application and is incorporated herein by reference. The software is composed of subroutines written in "C" or assembler. Each tool has an "ID code" associated with it from 1 to 16 depending upon the number of tools in the work cell. The preprocessor 18 checks for the proper ID in step 516 before allowing the robot to use the tool so that the robot cannot use the wrong type of tool for a particular task. With each tool ID the user can program up to 16 (or any arbitrary number) of different "formats" that an individual tool can operate under. For example, the drill could have one format which tells the drill to use a particular feed rate and depth control while another format might specify a completely different format of operation such as retract after breakthrough and use a slower feed rate. The robot controller 16 simply toggles one of 16 discrete I/O lines in cable 20 at step 520 to initiate any one of the 16 different formats. The basic concept behind these 16 signals is the same for all types of tools, although the format for each tool is different depending upon the type of tool. The user can quickly modify the formats at any time. Diagnostics are run continuously while in production. More thorough diagnostics can be run either under robot control or by the user to precisely pin-point a problem. In addition, any tool can be run manually while all relevant sensor information is being displayed on terminal 22 in real time.

In manual mode 502, the preprocessor 18 first asks the user to get the tool to be run manually and to place it in the quick change adapter 26. Once this has been done the preprocessor asks the user if the tool on the arm is what the ID code indicates that it is. If it is the correct one then a menu of commands to run that specific tool are displayed. Each type of tool has a real time display of all sensor information such as pounds of force on a load cell or the position of an encoder. In addition, the user may operate different solenoids from the keyboard and make any motors turn off or on. Basically, the user may check any individual component for either diagnostic or experimental purposes. Specific manual mode of operation for each tool is:

DRILL-Real time display of: thrust in both integer value and pounds exerted on the drill bit; real time display of the drill depth in both integer value and inches of drill extension from the nose; present value of ID code; status of part contact; cage extend switch; cage retract switch; drill motor extend switch; drill motor retract switch. Manual operation of: extend cage cylinder; retract cage cylinder; turn off all cylinders; extend drill feed; retract drill feed; turn on/off drill motor and coolant mist; release/couple quick change adapter.

PARTS MEASUREMENT GRIPPER-Real time display of: real time display of the finger width encoder in either encoder counts or inches which indicates the distance that the fingers are from one another; present value of ID code; status of fingers fully open or closed switch. Manual opertion of: open or close the gripper to either take a measurement or to grasp a part; release/couple quick change adapter.

NUTRUNNER-Real time display of: torque sensor in both integer value and inch pounds of torque exerted on the nut; real time display of the encoder which indicates the angle of rotation on nut; present value of ID code; status of excessive force on nut switch. Manual operation of: turn on/off nutrunner motor; release/couple quick change adapter.

TACTILE GRIPPER-Real time display of: both left and right fingertip force sensors and their average value to show "squeeze" being exerted on the part in both integer value and pounds; real time display of the fingertip position sensor in both integer value and inches of separation; present value of ID code; status of part contact infra-red light beam between fingertips. Manual operation of: open/close fingertips either quickly or slowly; release/couple quick change adapter.

In the diagnostics mode 504, the computer first asks the user to get the tool to be run manually and to place it in the quick change adapter 26. Once this has been done the computer asks the user if the tool on the arm is what the ID code indicates that it is. If it is the correct one, then a routine is entered which automatically cycles the tool through its paces. All sensors are checked for correct operation, motors are checked for proper speed and air cylinders are cycled. By turning off and on specific motors and cylinders at different times and comparing the resulting movements with anticipated sensory signals, different actuator and/or sensor faults are discerned. If an error is detected then the operator is notified through the display terminal 22. In addition, each component as it is being tested and the outcome of the test is displayed on the screen. Specific devices tested and the sequence in which this is done are:

DRILL-Encoder, analog, and motor control circuit boards are thoroughly tested; drill is fed to the bottom to test drill fully extended switch then it is fed to the top to test the drill fully retracted switch; drill then searches for the encoder zero; then drill is fed to midpoint to test encoder operation; motor air is turned on; cage is extended to test cage fully extended switch; cage is retracted to test cage fully retracted; motor air is turned off.

PARTS MEASUREMENT GRIPPER-Gripper is opened and open/close limit switch status is checked, gripper is closed to grasp part and open/close limit switch status is checked, gripper is opened and open/close limit status is checked, gripper is closed to take meaurement and determine if fingers are moving at the proper speed and that measurement electronics are operational.

NUTRUNNER-Initial encoder and analog torque values are recorded; nutrunner is started up and maximum torque is stored as nutrunner comes up to speed. Inertia from start up on torque sensor will indicate if analog sensor is reading properly (although not necessarily accurately). Also, encoder angle value is compared to pre start-up value. If torque and encoder did not significantly change then the display notifies the operator which, if any of the sensors are faulty. Status of nutrunner overload sensor is also displayed.

TACTILE GRIPPER-First zeroes itself out by closing gripper and recording value of position transducer when gripper is closed (this position is the null out for later position calculations). Left and right gripper pad force values are also stored when the fingers are not closed (these forces are the null out for later force calculations). Gripper opens completely and checks for proper operation of position transducer, gripper then closes completely to check that postion transducer indicates that gripper has closed. While gripper is closed the force on each fingertip is read to make certain that the gripper is producing the proper maximum force when the fingers are closed and that each of the individual fingertip pads are functioning.

In the alter production parameters mode 506, each tool can be programmed to operate in any number of ways. The robot controller 16 simply pulses one of 16 "PERFORM" lines in cable 20 going to the preprocessor 18 in step 520 to indicate how it wishes the tool presently being held by the robot arm to operate. These perform lines are similar among all of the various tools. How the preprocessor 18 handles the toggling of one of these lines depends completely upon which type of tool is currently being held on the robot arm and how the user previously programmed the tool to operate. The formats that can be programmed for each specific tool are listed below. For the robot controller to activate one of these sets of parameters, the proper PERFORM line must be toggled.

DRILL-Each of the 16 blocks of parameters has a feedrate, drill to depth (set to 0 if not drill to depth), peck drilling stroke (set to 0 if no peck drilling), average thrust while drilling (used for dull and broken bit detection), dull bit detection sensitivity, gauge line to tip of bit, and gauge line to countersink. Also, this block of parameters can be duplicated to another block, and lastly the user can perform a drilling operation using the parameters above as if the system were in production mode.

PARTS MEASUREMENT GRIPPER-There are 16 status lines which go from the preprocessor 18 to the robot controller 16. Eight of these status lines will go high whenever a measurement is made which results in a dimension which is greater than that set by the user and the other eight status lines will go high whenever a measurement is made which results in a dimension which is less than that set by the user. The alter parameters mode allows the user to change any one of these dimensions corresponding to a particular status line. After a measurement has been made, the robot can perform different tasks by making decisions based upon these status lines. Also, this block of parameters can be duplicated to another block, and lastly the user can perform a measurement operation using the parameters above as if the system were in production mode.

NUTRUNNER-Each of the 16 blocks of parameters allows the user to obtain a great deal of control over his nutrunning operation. The user may select either torque control or turn-of-the-nut mode. Fastener size, threads per inch, and presence/absence of lubrication on the nut must also be given by the user for display purposes and calculations when using turn-of-the-nut mode. The user can specify his measurements to be in inch pounds, foot pounds, inch ounces or newton meters. The preprocessor 18 rapidly changes from one measurement system to another. If the user chooses torque mode of operation, then only target torque, and upper and lower limits of torque are input, joint number, target torque and actual final torque (in the dimensions specified by the user) as well as fastener size will be displayed after each nut has been run down. If the user has chosen turn-of-the-nut mode of operation he may also specify whether parameters are entered in torque or tension units. If the user chooses that units be entered in torque, then only target torque, upper and lower limits of torque are input. Joint number, target torque, actual final torque, and actual final tension (in the dimensions specified by the user) as well as fastener size will be displayed after each nut has been run down in this case. Also, this block of parameters can be duplicated to another block, and lastly the user can perform a nutrunning operation using the parameters above as if the system were in production mode.

TACTILE GRIPPER-Each of the 16 blocks of parameters allows the user to specify the velocity at which the gripper is to move at, the force that the gripper is to move until (set to 0 if force irrelevant), the position that the gripper is to move to (set to 0 if position irrelevant, usually the case if moving to force). The move will be made until either the force or position occurs, whichever comes first. In addition there are 6 status lines from preprocessor 18 to the robot controller 16. Two are used to indicate that force thresholds have been met, and four are to indicate that position thresholds have been met. The user can set both the upper and lower force thresholds. He may also set each of the two lower position thresholds and the two upper position thresholds. Also, this block of parameters can be duplicated to another block, and lastly the user can perform a gripping operation using the parameters above as if the system were in production mode.

In production mode 508, the robot controller 16 pulses one of 16 "PERFORM" lines going to the preprocessor 18 to indicate how it wishes the tool presently being held by the robot arm to operate. Once the user places the system into production mode 508, it remains in that mode until either a fatal error or the user hits the emergency stop at which time the system will go back to the main menu in step 500. While in production mode 508 the 16 PERFORM lines are constantly being monitored as well as PICK UP TOOL or DROP OFF TOOL control lines. Action taken when these lines are toggled in steps 512 or 522 are described below:

DROP TOOL (Step 524)-Check is made to see if adapter 27 is not disabled; all solenoids and stepper motors are turned off; tool is dropped by retracting the balls 126 in the quick change; a tool "PROCEED" line to robot controller 16 is pulsed to tell robot to move away from droppeden met. The user can set both the upper and lower force thresholds. He may also set each of the two lower position thresholds and the two upper position thresholds. Also, this block of parameters can be duplicated to another block, and lastly the user can perform a gripping operation using the parameters above as if the system were in production mode.

PICK UP TOOL (Step 512)-Check is made to see if adapter 26 is not disabled; if there is presently no tool on the robot arm then the adapter 26 is uncoupled to prepare to pick up the tool. Robot arm is moved to mating position after preprocessor 18 pulses PROCEED line to indicate that all is well and that it is "OK" to get tool. When preprocessor 18 sees the identification code coming in from the adapter 26, the preprocessor grasps the tool with the adapter 26. If a change in the ID code is not seen within several seconds the TOOL CHECK line is pulsed to send the robot into a tool check since the robot probably got hung on the tool while moving to grasp it. In step 516, once the robot has the ID code off of the newly acquired tool, it is matched with the desired ID code coming out of the robot controller 16. If the two do not match up then the robot arm probably has acquired the wrong tool. The robot is sent into a tool check since this is a fatal error which would be difficult for the robot to recover from without operator attention.

In step 522, each tool uses the parameters in a different way when one or more lines is pulsed. The production mode 508 operates in the following manner for each of the end tools:

DRILL combinations of perform 0 and 1, 2, 3 or 4 produce the following:

0 and 1: pick up nose piece-The drill feed is extended to the drop/pickup nose position to arm the mechanics which grasp the nosepiece, cage is extended to get the nose, cage is retracted, the robot is told to proceed to the next task, and while the robot is moving drill feed is retracted to the start position.

0 and 2: drop off nose piece-The drill feed is extended to the drop/pickup nose position to drop the nosepiece, the robot is told to proceed to the next task and feed is retracted to the start position while the robot is moving.

0 and 3: pick up drill bit and nose piece-The drill feed is extended to the drop/pickup drill/nose position to arm the mechanics which grasp the nosepiece and the mechanics which hold the drill bit, cage is extended to get the nose and drill holder, the cage is retracted, the robot is told to proceed to the next task, and feed is retracted to the start position while the robot is moving.

0 and 4: drop off drill bit and nose piece-The drill feed is extended to the drop/pickup drill/nose position to drop the nose and drill bit, the robot is told to proceed to the next task and feed is retracted to the start position while the robot is moving.

Drill production mode does the following when drilling a hole: First all of the parameters pertaining to the ID code of the drill now on the arm are retrieved from memory and converted into values which are more directly applicable to the sensor circuits and motor controllers (i.e. feedrate is converted from inches per minute to pulses per second at which to drive the stepper motor). Encoder is then zeroed out if it has not been zeroed out by a previous drilling operation by searching for the index mark on the encoder scale while driving the stepper motor and thus drill feed to the top and bottom of travel. Once the zero has been found, all drill bit positions are referenced to this position. The robot begins drilling once the drill bit has been positioned near the tip of the nose. The preprocessor 18 knows how to do this because the dimensions of the drill are permanently programmed into the software and the user gives the distance from the tip of the bit to a gauge line on the tool holder. Once told to begin drilling the cage is first extended to press the nosepiece flush against the part. If the cage extended switch is tripped then the cage is overextended and the drill most likely did not touch the template (it would probably drill air at this point) in which case the robot would be sent into a tool check. A part contact switch is located on the nosepiece so that nose insertion into the template can be detected. If the nose is not in the template, then two more tries are made. If after the third try insertion is not achieved the robot is told to move to the next hole since the hole was probably poorly programmed. If part contact is made then the drill bit begins feeding into the part at the proper feed rate. A loop is then entered which monitors the drilling operation. First if for some reason the drill almost over extends, the drill is retracted from the part. Next, emergency stop either from the user or the robot will immediately retract the bit from the part. Next, if this is a drill to depth operation a check is made to see if depth has been reached and if so the loop is exited. Next, if this is a drill to countersink operation a check is made to see if countersink has been reached and if so the loop is exited. Next, if this is a peck drilling operation and the distance drilled since the last peck drilling operation has been exceeded then the drill is retracted from the part to remove any chips. Once the bit has been retracted from the hole it is rapidly fed back in to recommence with the drilling operation. Next, the thrust is monitored for both breakthrough and dull bit detection. The most recent thrust is read from the thrust sensor on the drill feed. If this is the highest thrust yet achieved it is stored if the drill is in teaching mode. If this is not a teaching mode, the most recent thrust is compared to "lothrust" (lothrust=maximum drilling thrustX8/dull bit sensitivity set by the user). If this thrust is below lothrust it is possible that either the bit is broken or it has been broken through the part in which case a dull bit counter is incremented. If this counter exceeds a value which is proportional to feed rate then the drill has broken through and is retracted. If the thrust is greater than lothrust then breakthrough is not occuring and the breakthrough counter is cleared out, also, a flag is set to indicate that the bit is not broken and minimum drilling thrust has occured. The thrust is then compared to "hithrust" (hithrust=maximum drilling thrustX1.1Xdull bit sensitivity set by the user). If it is lower than hithrust the counter which keeps track of dull bit occurrences is cleared out. If it is more than hithrust then this dull bit counter is incremented. If this counter exceeds a value which is proportional to feed rate then the drill is dull and is retracted from the part, also, the robot is told to go into a sequence to automatically change out the dull drill bit. The loop above is continued until one of the conditions occurs. If lothrust did not occur in the above loop then the bit is believed to be broken and the robot is sent over to change out the drill bit. When a condition occurs to exit the loop the drill either stops all movement, is sent into a tool check, is sent to change out a drill bit or the robot simply is told to proceed to the next task, normally to drill another hole.

PARTS MEASUREMENT GRIPPER-The parts measurement software is relatively simple. The PERFORM lines are not set up the same as for other tools. They are "hard wired" to do specific tasks through the software. The PERFORM lines and what they do are numbered below:

0 turn off all solenoids (i.e. let gripper hang loose)
1 open gripper completely
2 close gripper completely
3 close on part and measure, do not open after measurement
4 close on part and measure, open after measurement
5 calibrate gripper on 1 inch part. After gripper is calibrated all measurements made are relative to this measurement. Measurements are meaningless before this is done.

The parts measurement gripper is operated with air cylinders. To open and close the grippers high pressure is used to move the grippers. When measurements are to be made lower pressure is used to close the gripper in order to minimize deflection of the fingertips. After every move has been made the status lines from the preprocessor 18 to the robot controller 16 are updated. Depending upon how the user set up his system these lines will turn on or off depending upon the dimension of the part. Eight of these lines will turn on when a measurement is made which is greater than set by the user. Likewise another eight lines turn on when a measurement is made which is less than that set by the user. The user can make his robot read these lines to make decisions as to what to do with a part. In addition, there are lines to the robot controller 16 which continuously monitor whether the gripper is open or closed or if the infra-red part detection light beam in the fingertips have been tripped.

NUTRUNNER-The nutrunner has many modes of operation. All parameters entered by the user while in the alter production mode 506 are first checked to see that they are valid depending upon the mode that the user wishes that the nuts be run down (torque or turn-of-the-nut), and how the parameters were entered (in tension or torque parameters). If any parameters are invlaid, the user is notified. If it is determined that all parameters are valid, conversion factors and units are calculated. The computer stores all values in inch pounds, these conversion factors are used only when storing values in the alter production parameter mode (to get values into inch pounds), and after a nut has been run down and the results are printed on the terminal 22.

The target torque is converted into an analog strain gage threshold value when running nuts in the torque mode. When a nut is run down, the valve shut off time and the inertia of the air motor and nutrunner assembly will over torque the nut unless the nutrunning system is able to anticipate when to turn off the nutrunner. This anticipated over run analog torque value is subtracted from the target value calculated above so that the nutrunner can "coast" into the proper torque after the motor air supply has been shut off. This anticipated over run analog torque value (seed) can be entered by the user while a nut is being run down. The user can determine a seed through trial and error. After a seed has been entered the nutrunning system will "home in" on a precise anticipated over run analog torque value. Every nut that is run down will adjust this value to compensate for the changing environment (such as tool wear, change in lubrication, quality of bolt, surface finish of assembly, etc.). Once the nutrunner is started, torque is monitored several thousand times per second. The elapsed time before torque is reached is also measured, and if reached too early it is likely that the bolt has cross threaded. If cross threading is detected, the nutrunning operation will halt immediately and the operator notified. The motor air solenoid is turned off when the torque analog shut-off vlaue has been reached. Final maximum torque, target torque, fastener size and joint number are printed after the nut has been run down. After every joint has been made the joint number is incremented. The user's terminal displays the most recent results. If the final torque is not within the window set by the user, the preprocessor 18 will send an error signal to the robot controller and the bad values will be displayed. Lastly, the anticipated torque analog value will be adjusted accordingly.

Target torque or tension is converted into an angle to rotate the nut through after it has become "snug" when running nuts in turn-of-the-nut mode. An equation relating fastener size, diameter, lubrication, pitch, target torque (or tension), and a constant determined actual parts to be fastened are used to calculate the angle. When a nut is run down, the valve shut off time, inertia of the air motor and nutrunner assembly will over tighten the nut unless the nutrunning system is able to anticipate when to turn off the nutrunner. This anticipated over run rotation angle is subtracted from the target angle calculated above so that the nutrunner can "coast" to the proper angle after the motor air supply has been shut off. This anticipated over run angle (seed) can be entered by the user while a nut is being run down. The user can determine a seed through trial and error. After a seed has been entered the nutrunning system will "home in" in a precise anticipated over-run angle. Every nut that is run down will adjust his value to compensate for the changing environment (such as tool wear, change in lubrication, quality of bolt, surface finish of assembly, etc.). The torque is monitored several thousand times per second after the nutrunner is started. The elapsed time before torque is reached is also measured and if reached too early it is likely that the bolt has cross threaded. If cross threading is detected, the nutrunning operation will halt immediately and the operator notified. When five per cent of the final torque is reached, the computer begins monitoring the angle through which the nutrunner turns. When the angle reaches the target angle less the over-run angle, the solenoid is turned off. Final torque and tension, target torque and tension, fastener size and joint number are printed out after each nut has been run down. The user's screen displays the most recent results. If the final nutrunning results are not within the window set by the user, the preprocessor will send an error signal to the robot controller and the bad values will be printed in reverse video. After every joint has been made the joint number is incremented. Lastly, the anticipated over-run angle will be adjusted accordingly.

TACTILE GRIPPER-Each block of parameters contains the speed at which to make a movement, the target position, target fingertip force, and threshold values of force and position which the user may arbitrarily set. All of the PERFORM lines can be used in coordination with one another to obtain a powerful tactile gripping application. Once the forces, positions and movement speeds have been converted into values which can be directly applied to the sensors and actuators to be controlled (such as pounds force being converted into analog sensor threshold integer values), the stepper begins movement to the closed position if the force is non-zero. If the force is zero, the user wishes to move to a position, in which case the fingers will move in the proper direction depending upon their present position. If the grippers are moving to a position then movement will stop when the position is reached. If the gripper is closing on an object to a certain force, then the fingers will be stopped when that force has been reached. If the user wishes to have the gripper move to a position but stop if a force is reached en route, then he must merely program a force and a position to move to. The gripper will close and stop at position or force, whichever comes first. As the gripper is moving several status lines are constantly being updated: gripper open, gripper closed, and if a part has been detected between the light beam sensor in the fingertips. One set of status lines are set aside for the user to determine when force thresholds have been met and another two sets of status lines are used to determine when position thresholds have been met. Each set has a line which will be on if the result is greater than the user's threshold and the other will be on if the result is less than the user's threshold.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A method of performing multiple tasks upon a work piece within a work cell with a robot arm and robot controller comprising the steps of:
  (a) connecting a quick change adapter to the end of the robot arm;
  (b) connecting a preprocessor to the robot controller and quick change adapter;
  (c) placing at least two tools within the work cell;
  (d) picking up a first of said two tools with said quick change adapter, thereby establishing power and intelligence communications between said tool and said preprocessor;
  (e) positioning the robot arm and said first tool at a work location within the work cell by means of signals from said robot controller;
  (f) performing a predetermined first task on the work piece with said first tool when located at the work location by means of signals from said preprocessor;

(g) dropping the tool in response to signals from the preprocessor indicating that the task is completed; and (h) repeating steps (d), (e), (f) and (g) with the second of said two tools to perform a predetermined second task.

2. The method of claim 1 further comprising the steps of checking identification codes associated with said tools and aborting the method if the identification code of one of the tools indicates that an incorrect tool has been picked up.

3. The method of claim 2 further comprising the steps of reading parameters for said tasks from a computer memory and causing said tasks to be performed according to said parameters.

4. The method of claim 3 further comprising the steps of altering the parameters in the computer memory prior to the step of reading the parameters.

5. The method of claim 1 wherein one of said task comprises drilling a hole in the work piece.

6. The method of claim 1 wherein one of said task comprises gripping the work piece.

7. The method of claim 1 wherein one of said task comprises measuring the work piece.

8. The method of claim 1 wherein one of said task comprises fastening a nut to the work piece.

9. The method of claim 7 wherein one of said task comprises measuring the work piece, comparing the measurement to a dimension stored in a computer memory, and manipulating the work piece in accordance with the comparison.

10. The method of claim 1 further comprising analyzing measurement signals from the tools to determine when the tasks are completed.

11. The method of claim 1 further comprising calculating measurement values from the measurement signals and displaying the measurement values on a terminal.

12. An interchangeable robot end-of-arm tooling system for use with a robot arm controlled by a computer, comprising:

(a) an adapter attached to the end of the robot arm and having locking means for physically supporting each of a plurality of tools and connector means for establishing power and intelligence communications with each tool;

(b) each of said plurality of tools having means for interconnection with said connector means on said adapter, means for interconnection with said locking means on said adapter, means for performing a task on an object, and means for sensing one or more conditions associated with said task performable by said tool; and (c) computing means electrically connected to said adapter and to the computer for said robot arm for instructing the robot arm computer to move the arm to preprogrammed positions, for operating a tool connected and locked to the adapter through intelligence and power communication sent to and received from the tool, and for performing a sequence of preprogrammed tasks with said plurality of tools.

* * * * *

UNITED STATES PATENT AND TRADEMARK OFFICE
CERTIFICATE OF CORRECTION

PATENT NO. : 4,611,377

DATED : Sep. 16, 1986

INVENTOR(S) : McCormick et al

It is certified that error appears in the above-identified patent and that said Letters Patent is hereby corrected as shown below:

Col. 5, line 19 (p. 10, line 13), "Ball" should be --Balls--.

Col. 6, lines 7-8 (p. 12, line 9) "surface" should be --surfaces--.

Col. 7, line 22 (p. 14, line 31) "382 and 382" should be --382 and 384--.

Col. 10, line 45, "postion " should be --position--.

Col. 15, line 53, "in a" should be --on a--.

Col. 17, line 19 "task" should be -tasks--.

Col. 17, line 25 "task" should be --tasks--.

UNITED STATES PATENT AND TRADEMARK OFFICE
CERTIFICATE OF CORRECTION

PATENT NO. : 4,611,377

DATED : Sep. 16, 1986

INVENTOR(S) : McCormick et al

It is certified that error appears in the above-identified patent and that said Letters Patent is hereby corrected as shown below:

Col. 17, line 27, "task" should be --tasks--.

Signed and Sealed this

Tenth Day of March, 1987

*Attest:*

DONALD J. QUIGG

*Attesting Officer*  *Commissioner of Patents and Trademarks*